United States Patent [19]

Reimann et al.

[11] Patent Number: 4,554,320

[45] Date of Patent: Nov. 19, 1985

[54] NYLON MOLDING MATERIALS HAVING HIGH IMPACT STRENGTH

[75] Inventors: Horst Reimann, Worms; Walter Ziegler, Edingen-Neckarhausen; Franz Brandstetter, Neustadt; Rainer Theysohn, Frankenthal; Richard Pflueger, Ludwigshafen, all of Fed. Rep. of Germany

[73] Assignee: BASF Aktiengesellschaft, Fed. Rep. of Germany

[21] Appl. No.: 701,449

[22] Filed: Feb. 13, 1985

Related U.S. Application Data

[63] Continuation of Ser. No. 498,756, May 27, 1983, abandoned.

[30] Foreign Application Priority Data

May 29, 1982 [DE] Fed. Rep. of Germany ....... 3220380

[51] Int. Cl.$^4$ .......................... C08F 8/30; C08L 31/00
[52] U.S. Cl. ..................................... 525/183; 525/184
[58] Field of Search ............................... 525/183, 184

[56] References Cited

U.S. PATENT DOCUMENTS

| | | | |
|---|---|---|---|
| 3,472,916 | 10/1969 | Anspon et al. | 525/183 |
| 3,742,916 | 7/1973 | Wessberg et al. | 122/390 |
| 3,845,163 | 10/1974 | Murch | 525/183 |
| 4,246,371 | 1/1981 | Meyer et al. | 525/183 |

FOREIGN PATENT DOCUMENTS

| | | |
|---|---|---|
| 1138922 | 10/1962 | Fed. Rep. of Germany . |
| 1241606 | 7/1967 | Fed. Rep. of Germany . |
| 1669702 | 5/1973 | Fed. Rep. of Germany . |
| 2622973 | 12/1976 | Fed. Rep. of Germany . |
| 2713537 | 9/1978 | Fed. Rep. of Germany . |
| 1504113 | 12/1967 | France . |

*Primary Examiner*—John C. Bleutge
*Assistant Examiner*—A. L. Carrillo
*Attorney, Agent, or Firm*—Keil & Weinkauf

[57] ABSTRACT

Novel nylon molding materials having high impact strength contain, as an additive, a copolymer of ethylene, a primary or secondary $C_2$–$C_8$-alkyl acrylate or methacrylate and a monomer possessing a (latent) acid functional group, in particular an ethylene/n-butyl acrylate/acrylic acid copolymer.

4 Claims, No Drawings

NYLON MOLDING MATERIALS HAVING HIGH IMPACT STRENGTH

This application is a continuation of application Ser. No. 498,756, filed on May 27, 1983, now abandoned.

The present invention relates to polymer blends which are based on nylons and possess great toughness coupled with excellent homogeneity and good processability.

The mechanical properties of polymers frequently depend on the type of pre-treatment they receive. Thus, the impact strength of nylon moldings depends substantially on their water content.

In the anhydrous state, in particular moldings produced from readily flowing, preferably highly crystalline, nylons of medium molecular weight are relatively sensitive to impact. There is therefore a need for rapidly processable, readily flowing nylons which give, in particular, moldings possessing high impact strength in the dry state. Of particular interest are those nylons which possess high tensile strength, high heat distortion-resistance, good resistance to solvents and ease of processing coupled with high impact strength and flexibility.

Various processes for increasing the toughness and flexibility of nylons have been disclosed. This may be achieved, for example, by mixing low molecular weight plasticizers into nylons, but for a number of reasons this is not a satisfactory solution to the problem. The majority of plasticizers suitable for plastics is not sufficiently compatible with nylons; they separate out during processing or tend to exude. However, compatible plasticizers which form true solutions with nylons in general have an adverse effect on their good mechanical properties. Although strongly polar substances of low molecular weight, eg. water or dimethylformamide have a pronounced plasticizing effect, they can only be incorporated into the nylon moldings after the production of the latter, since, otherwise, the relatively low boiling points of these plasticizers would result in bubble-containing moldings being obtained when the pretreated nylon granules were proccessed. Furthermore, the relatively high vapor pressure of such a plasticizer causes some of it to escape from the nylon molding treated in this manner. An attempt has also been made to improve the impact strength of nylons by admixing polymeric substances, such as polyethylene and vinyl acetate/ethylene copolymers (German Published Application DAS 1,138,922). Although very thorough kneading is required to prepare such mixtures, some of them tend to separate when processed further, for example by injection molding. Moldings produced from these mixtures therefore tend to undergo white fracture.

The flexibility of nylons may also be increased by mixing in polyethylenes possessing acidic groups, eg. copolymers of ethylene with unsaturated acids, or graft polymers of polyethylene with unsaturated acids. Although mixtures of this type are more finely divided and, under stress, exhibit white fracture much less readily than the above mixtures, they possess, apart from slightly improved toughness and flexibility, substantially poorer mechanical properties, eg. modulus of elasticity, tensile strength, hardness and rigidity, than the nylons themselves.

Thus, U.S. Pat. No. 3,742,916 and German Pat. No. 1,669,702 disclose that a certain improvement can be achieved by employing copolymers of ethylene with tertiary acrylates or methacrylates. The products possess unsatisfactory thermal stability. The notched impact strength of the freshly produced molding is still unsatisfactory, as is the noticeable tendency to separation. The alloys disclosed in U.S. Pat. No. 3,845,163 or French Pat. No. 1,504,113 possess the same disadvantage, and have further disadvantages owing to the methacrylic acid, some of which is present as a salt. Thus, it is known that, in the presence of metal ions, the resistance to tracking decreases so substantially that the products are hardly suitable for use in the electrical industry. Moreover, the majority of the metal ions used for neutralization, eg. $Zn^{2+}$, $Ba^{2+}$, $Cd^{2+}$ and $Hg^{2+}$, are physiologically unacceptable, so that the use of such products is not permitted either in the food packaging sector or as toys.

Copolymers of ethylene, acrylic or methacrylic acid and acrylates or methacrylates as an elastifying component have also been added to nylons (German Published Application DAS 1,241,606), with the result that the impact strength was improved. However, the products described in that publication also do not have very high impact strengths.

U.S. Pat. No. 4,246,371 describes products which have very high impact strength and contain tertiary copolymers of ethylene with 4% by weight of acrylic acid and 12% by weight of ethyl acrylate or 7% by weight of tert.-butyl acrylate. The nylon employed must have a relative viscosity of not less than 3.5. Because of their inadequate flow, products of this type are very difficult to process.

German Laid-Open Application DOS 2,622,973 discloses that a nylon can be toughened by adding a polymer which adheres to the nylon at points and has a tensile modulus of elasticity which is lower than that of the nylon by a factor of 10 or more, ie. is very soft. The polymers are employed in a partially neutralized form; owing to the presence of metal ions, the products are hardly suitable for use in the electrical industry.

We have found, surprisingly, that the disadvantages of the conventional products can be overcome, and that nylons which have very high impact strength and are stable to processing are obtained, if a non-crosslinked, thermally stable ethylene copolymer having the composition according to the invention is employed.

The present invention therefore relates to nylon molding materials which have high impact strength and contain (A) a thermoplastic nylon having a relative viscosity of from 2.5 to 5, and
(B) from 5 to 65% by weight, based on (A), of a non-crosslinked copolymer which contains three or more components and comprises
  (a) from 55 to 79.5% by weight of ethylene,
  (b) from 20 to 40% by weight of one or more primary or secondary $C_2$–$C_8$-alkyl acrylates or methacrylates and
  (c) from 0.5 to 8% by weight of a monomer possessing an acidic functional group or a latent acidic functional group,
  the sum of components (a)–(c) being 100% by weight, with or without
(C) effective amounts of conventional additives.

The nylons according to the invention are known pe se, and include semi-crystalline and amorphous resins which have molecular weights of not less than 5,000 and are usually referred to as nylon. Such nylons are described in U.S. Pat. Nos. 2,071,250, 2,071,251, 2,130,523, 2,130,948, 2,241,322, 2,312,966, 2,512,606 and 3,393,210. The nylon resin can be prepared by condensation of equimolar amounts of a saturated dicarboxylic acid of 4 to 12 carbon atoms with a diamine of 4 to 14 carbon atoms. In order to obtain a nylon containing more terminal amino groups than terminal carboxyl groups, the diamine can be employed in excess. Examples of nylons are polyhexamethyleneadipic acid amide (Nylon 66), polyhexamethyleneazelaic acid amide (Nylon 69), polyhexamethylenesebacic acid amide (Nylon 610), polyhexamethylenedodecanedioic acid amide (Nylon 612), the nylons obtained by subjecting lactams to ring-opening, eg. polycaprolactam and polylaurolactam, and poly-11-aminoundecanoic acid and bis(p-aminocyclohexyl)-menthanedodecanedioic acid amide. It is also possible to use, in accordance with the invention, nylons which have been obtained by copolymerization of two of the above polymers, or by terpolymerization of the above polymers or their components, eg. a copolymer of adipic acid, isophthalic acid and hexamethylenediamine. Preferably, the nylons are linear and have melting points above 200° C.

Preferred nylons are polyhexamethyleneadipic acid amide and polycaprolactam. The nylons have a relative viscosity of in general from 2.5 to 5, preferably from 3 to 3.5, in particular from 3.1 to 3.4, determined for a 1% strength solution in $H_2SO_4$ at 23° C.

The novel copolymers should be non-crosslinked ie. they should have a solubility of not less than 90% in hot solvents, such as toluene, ethylbenzene or tetrachloroethylene. They contain (a) from 55 to 79.5% by weight of ethylene, (b) from 20 to 40, preferably from 25 to 38, in particular from 31 to 36, % by weight of one or more primary or secondary $C_2$–$C_8$-alkylacrylates or methacrylates, preferably n-butylacrylate, and (c) from 0.5 to 8% by weight of a monomer containing acidic groups, eg. acrylic or methacrylic acid, or of a monomer containing blocked acidic groups which forms acidic groups under the compounding or polymerization conditions, eg. maleic anhydride, tert.-butylacrylate or tert.-butylmethacrylate.

The preferred copolymers have a melting range (or melting point) between 40° and 100° C. and possess a glass transition temperature below $-20°$ C., in particular below $-50°$ C. Advantageously, the shear modulus (according to DIN 53,445) of the copolymers used is less than 100, particularly less than 50, (Nmm$^{-2}$) at $-20°$ C., less than 50, in particular less than 20, (Nmm$^{-2}$) at 0° and less than 20, in particular less than 10, (Nmm$^{-2}$) at $-20°$ C.

The copolymers are in general high molecular weight substances, and possess a melt index MFI 190/2.16 (DIN 53,735) of from 4 to 20. They are employed in an amount of from 5 to 60, preferably from 5 to 40, in particular from 8 to 25, % by weight, based on the polymer. The copolymers are prepared in a conventional manner, by polymerization of the components at elevated temperatures under a high ethylene pressure.

The materials according to the invention can be modified by conventional additives, such as stabilizers, oxidation retarders, heat stabilizers, UV stabilizers, lubricants, mold-release agents, colorants, eg. dyes and pigments, fibrous and pulverulent fillers and reinforcing agents, nucleating agents, plasticizers, etc.; these additives are employed in the conventional effective amounts.

The stabilizers can be added at any stage of the preparation of the thermoplastic materials. They are preferably added at an early stage in order to prevent decomposition from beginning before the material can be protected. Such stabilizers must be compatible with the materials.

The oxidation retarders and heat stabilizers which may be added to the thermoplastic materials according to the invention include those which are generally added to polymers, eg. halides of metals of Group I of the periodic table, eg. sodium, potassium or lithium, phenols which are sterically hindered by copper (I) halides, eg. the chloride, bromide or iodide, hydroquinones, various substituted compounds from these groups, and combinations of these; they are employed in concentrations of not more than 1% by weight, based on the weight of the nylon.

The UV stabilizers used are likewise those which are generally added to polymers; they are employed in amounts of not more than 2.0% by weight, based on the nylon. Examples of UV stabilizers are various substituted resorcinols, salicylates, benzotriazoles, benzophenones and the like.

Suitable lubricants and mold-release agents, which are added to the thermoplastic material in amounts of, for example, not more than 1.0% by weight, are stearic acid, stearyl alcohol and stearamides. It is also possible to add organic dyes, eg. nigrosine, etc., pigments, eg. titanium dioxide, cadmium sulfide, cadmium sulfide selenide, phthalocyanines, ultramarine blue, carbon black, etc., fibrous and pulverulent fillers and reinforcing agents, eg. carbon fibers, glass fibers, amorphous silica, asbestos, calcium silicate, aluminum silicate, magnesium carbonate, kaolin, chalk, powdered quartz, mica, feldspar, etc., in amounts of not more than 50% by weight, based on the materials, nucleating agents, eg. talc, calcium fluoride, sodium phenyl phosphinate, aluminum oxide, finely divided polytetrafluoroethylene, etc., plasticizers in amounts of not more than about 20% by weight, based on the material, eg. dioctyl phthalate, dibenzyl phthalate, butyl benzyl phthalate, hydrocarbon oils, N-n-butylbenzenesulfonamide, o- and p-tolylethylsulfonamide, etc. The colorants (dyes and pigments) can be added in amounts of not more than about 5.0% by weight, based on the materials.

The toughened materials according to the invention are conventionally prepared in a closed system by mixing the molten nylon with the melts of the remaining components to give a homogeneous mixture; mixing is carried out in a multi-screw extruder, eg. a Werner and Pfleiderer twin-screw extruder, or another conventional plasticizing apparatus, eg. a Brabender mill, a Banbury mill or the like. The mixtures can also be prepared by precipitating the components together from solution or by mixing or dry blending the components and then extruding a melt of the dry mixture.

As a result of the thorough mixing, the copolymer is dispersed in the nylon, in the form of individual particles having a size of less then 3 μm, preferably less than 1 μm.

The novel molding materials can be processed by injection molding or extrusion, and are useful for the production of thermally stable moldings which are suitable for all types of industrial uses, have high impact strength and can be subjected to high loads.

EXAMPLES 1 TO 6

100 Parts by weight of a nylon 6 having a relative viscosity of 2.7, measured in a 1% strength solution in concentrated $H_2SO_4$ at 23° C., and 11 parts by weight of various ethylene terpolymers having the compositions shown in Table 1 and a melt index of from 5 to 10 (g/10 min) measured at 190° C. and using a 2.16 kg weight, were fed, via two separate conveyor-type weighers, into the charging orifice of a twin-screw extruder of the ZSK 53 type, kneaded at 150 rpm at 280° C., and extruded into a water bath. After granulation and drying, the mixtures were molded in an injection molding machine to give samples, which were dried and then tested. The notched impact strengths according to DIN 53,453 which are given in Table 1 show that the toughness passes through a maximum as the content of nBA in the terpolymer increases.

EXAMPLES 7 TO 15

The mixtures 7 to 15 were prepared by a procedure similar to that described in Examples 1 to 6. In the examples, a terpolymer according to the invention was compared with a terpolymer comprising ethylene, t-butyl acrylate and acrylic acid, as employed in German Laid-Open Application DOS 2,713,537. The advantage of the increased notched impact strength is evident when the novel terpolymer is used in Nylon 6, Nylon 69 and even Nylon 66.

EXAMPLES 16 TO 21

The mixtures shown in Table 2 were prepared by a procedure similar to that described in Examples 1 to 6.

mers cause a drastic reduction in the multiaxial toughness.

EXAMPLE 22

A mixture of 100 parts by weight of a Nylon 6 having a relatively viscosity of 3.3 with 25 parts by weight of a 77.2:32:0.8 terpolymer of ethylene, n-butyl acrylate and maleic anhydride was prepared as described in Examples 1 to 6. The notched impact strengths measured on samples produced from this mixture were 40.7 (kJ m$^{-2}$) at +23° C., 11.0 (kJ m$^{-2}$) at −20° C. and 11.3 (kJ m$^{-2}$) at −40° C.

EXAMPLES 23 AND 24

100 Parts by weight of Nylon 6 having a relative viscosity of 3.3 were mixed as described in Examples 1 to 6, at 270° C., with 25 parts by weight of a 69:27:4 terpolymer of ethylene, n-butyl acrylate and acrylic acid or an 89:7:4 terpolymer of ethylene, t-butyl acrylate and acrylic acid, corresponding to the terpolymer used in German Laid-Open Application DOS 2,713,537. When the stability of the melt was tested the melt viscosity of the novel product at 290° C. remained constant over a period of more than 15 minutes, while in the case of the product obtained using the t-butyl acrylate terpolymer the melt viscosity decreased and bubbles were formed in the melt.

TABLE 1

| Example | Nylon 100 parts by weight | rel. viscosity | Copolymer | Amount (parts by weight) | Notched Impact Strength [kJ m$^{-2}$] (DIN 53 453) | | |
|---|---|---|---|---|---|---|---|
| | | | | | 23° C. | −20° C. | −40° C. |
| 1+ | PA 6 | 2.7 | E-tBA-AS (89-7-4) | 11 | 9.4 | 3.1 | 2.7 |
| 2+ | PA 6 | 2.7 | E-nBA-AS (88-8-4) | 11 | 9.5 | 3.6 | 3.0 |
| 3 | PA 6 | 2.7 | E-nBA-AS (75-21-4) | 11 | 12.5 | 4.2 | 3.2 |
| 4 | PA 6 | 2.7 | E-nBA-AS (69-27-4) | 11 | 13.9 | 4.5 | 3.5 |
| 5 | PA 6 | 2.7 | E-nBA-AS (61-35-4) | 11 | 14.5 | 3.3 | 2.0 |
| 6+ | PA 6 | 2.7 | E-nBA-AS (54-42-4) | 11 | 10.1 | 3.0 | 2.0 |
| 7+ | PA 6 | 4 | E-tBA-AS (89-7-4) | 11 | 7.2 | 2.8 | 2.5 |
| 8 | PA 6 | 4 | E-nBA-AS (69-27-4) | 11 | 28.9 | 4.5 | 3.4 |
| 9+ | PA 6 | 4 | E-tBA-AS (89-7-4) | 25 | 27.1 | 6.6 | 4.3 |
| 10 | PA 6 | 4 | E-nBA-AS (69-27-4) | 25 | 54.7 | 10.9 | 5.6 |
| 11+ | PA 69 | 3.3 | E-tBA-AS (89-7-4) | 25 | 12.1 | 3.5 | 3.4 |
| 12 | PA 69 | 3.3 | E-nBA-AS (69-27-4) | 25 | 35.2 | 7.3 | 4.5 |
| 13+ | PA 66 | 2.7 | E-tBA-AS (89-7-4) | 25 | 6.5 | 3.3 | 2.5 |
| 14 | PA 66 | 2.7 | E-nBA-AS (67-29-4) | 25 | 31.2 | 6.2 | 3.6 |
| 15 | PA 66 | 2.7 | E-nBA-AS (61-35-4) | 25 | 39.7 | 7.9 | 3.6 |
| 7a+ | PA 6 | 4 | without additive | — | 6.8 | 2.4 | 1.8 |
| 11a+ | PA 69 | 3.3 | without additive | — | 3.0 | 2.5 | 2.2 |
| 13a+ | PA 66 | 2.7 | without additive | — | 2.3 | 0.9 | 0.9 |

+not according to the invention

TABLE 2

| Example Test No. | Nylon 100 parts by weight | rel. viscosity | Copolymer | Amount (parts by weight) | Notched impact strength +23° C. | Impact Perforation Work on a circular disk, 2 mm [Nm] | | |
|---|---|---|---|---|---|---|---|---|
| | | | | | | +23° C. | −20° C. | −40° C. |
| 16+ | PA 6 | 3.3 | E-tBA-AS (89-7-4) | 25 | 24 | 69.1 | 33.3 | 2.0 |
| 17 | PA 6 | 3.3 | E-nBA-AS (67-29-4) | 25 | 45 | 73.2 | 59.3 | 20.6 |
| 18 | PA 6 | 3.3 | E-nBA-AS (64-32-4) | 25 | 48 | 66.2 | 36.5 | 24.3 |
| 19 | PA 6 | 3.3 | E-nBA-AS (59-37-4) | 25 | 50 | 61.7 | 48.9 | 36.2 |
| 20+ | PA 6 | 3.3 | E-nBA-AS (54-42-4) | 25 | 38 | 13.8 | 6.9 | 3.7 |
| 21+ | PA 6 | 3.3 | E-nBA-AS (47-49-4) | 25 | 43 | 10.4 | 4.9 | 1.9 |

+not according to the invention

In the examples, the impact perforation work in the Plastechon test was compared for various terpolymer additives. This work is a measure of the multiaxial toughness of a molding. Since the additive with a high nBA content are soft, the notched impact strength is still relatively high; however, these very soft terpolymers

We claim:
1. A nylon molding material which has high impact strength and contains
   (A) a thermoplastic nylon having a relative viscosity of from 2.5 to 5, and
   (B) from 5 to 65% by weight, based on (A), of a non-crosslinked copolymer which contains three or more components and is characterized by a melting range of from 40° to 100° C., a glass transition temperature of below −20° C. and a shear modulus of less than 100 (Nmm$^{-2}$) at −20° C., less than 50 (Nmm$^{-2}$) at 0° C. and less than 20 (Nmm$^{-2}$) at +20° C.; said copolymer comprising:
(a) from 55 to 75% by weight of ethylene,
(b) from 20 to 40% by weight of one or more primary or secondary $C_2$-$C_8$-alkyl acrylates or methacrylates and
(c) from 0.5 to 8% by weight of a monomer selected from the group consisting of maleic anhydride, acrylic acid and methacrylic acid,
the sum of components (a)–(c) being 100% by weight, with or without
(C) effective amounts of conventional additives.

2. A nylon molding material having high impact strength, as claimed in claim 1, wherein component (b) is n-butyl acrylate.

3. A nylon molding material which has high impact strength and contains
(A) a thermoplastic nylon having a relative viscosity of from 2.5 to 5, and
(B) from 5 to 65% by weight, based on (A), of a non-crosslinked copolymer which contains three or more components and is characterized by a melting range of from 40° to 100° C., a glass transition temperature of below −20° C. and a shear modulus of less than 100 (Nmm$^{-2}$) at −20° C., less than 50 (Nmm$^{-2}$) at 0° C. and less than 20 (Nmm$^{-2}$) at +20° C.; said copolymer comprising:
(a) from 55 to 75% by weight of ethylene,
(b) from 20 to 40% by weight of one or more primary or secondary $C_2$-$C_8$-alkyl acrylates or methacrylates and
(c) from 0.5 to 8% by weight of maleic anhydride,
the sum of components (a)–(c) being 100% by weight, with or without
(C) effective amounts of conventional additives.

4. A nylon molding material which has high impact strength and contains
(A) a thermoplastic nylon having a relative viscosity of from 2.5 to 5, and
(B) from 5 to 65% by weight, based on (A), of a non-crosslinked copolymer which contains three or more components and is characterized by a melting range of from 40° to 100° C., a glass transition temperature of below 20° C. and a shear modulus of less than 100 (Nmm$^{-2}$) at −20° C., less than 50 (Nmm$^{-2}$) at 0° C. and less than 20 (Nmm$^{-2}$) at +20 C.; said copolymer comprising:
(a) from 56 to 68.5% by weight of ethylene,
(b) from 31 to 36% by weight of one or more primary or secondary $C_2$-$C_8$-alkyl acrylates or methacrylates and
(c) from 0.5 to 8% by weight of acrylic acid or methacrylic acid,
the sum of components (a)–(c) being 100% by weight, with or without
(C) effective amounts of conventional additives.

* * * * *